US008296370B2

(12) United States Patent
Adams et al.

(10) Patent No.: US 8,296,370 B2
(45) Date of Patent: Oct. 23, 2012

(54) SYSTEM AND METHOD OF SHARING AUTO-REPLY INFORMATION

(75) Inventors: Neil Adams, Waterloo (CA); Raymond Vander Veen, Waterloo (CA)

(73) Assignee: Research In Motion Limited, Waterloo (CA)

( * ) Notice: Subject to any disclaimer, the term of this patent is extended or adjusted under 35 U.S.C. 154(b) by 877 days.

(21) Appl. No.: 11/352,315

(22) Filed: Feb. 13, 2006

(65) Prior Publication Data
US 2007/0192418 A1    Aug. 16, 2007

(51) Int. Cl.
*G06F 15/16* (2006.01)
(52) U.S. Cl. ......................................... 709/206; 709/248
(58) Field of Classification Search .................. 709/206, 709/217, 205, 204, 202, 245, 237, 230, 227, 709/224, 223, 207, 203, 225; 705/1, 37; 379/88.13, 210, 204, 205, 206, 207, 88.02, 379/88.01, 211.02, 207.02, 537, 202.01, 379/88.19, 88.03, 221.01, 218.01, 210.01, 379/201.1, 201.06; 358/1.15; 715/753; 455/417, 455/574, 566, 522, 518, 456.5, 456.1, 450; 370/229, 254, 352, 349, 299
See application file for complete search history.

(56) References Cited

U.S. PATENT DOCUMENTS

| | | | |
|---|---|---|---|
| 6,658,095 B1* | 12/2003 | Yoakum et al. | 379/93.01 |
| 6,968,052 B2* | 11/2005 | Wullert, II | 379/210.01 |
| 7,353,455 B2* | 4/2008 | Malik | 715/758 |
| 2003/0218631 A1 | 11/2003 | Malik | |
| 2004/0003037 A1* | 1/2004 | Fujimoto et al. | 709/203 |
| 2004/0133638 A1* | 7/2004 | Doss et al. | 709/203 |
| 2005/0034079 A1* | 2/2005 | Gunasekar et al. | 715/753 |
| 2005/0055405 A1* | 3/2005 | Kaminsky et al. | 709/206 |
| 2006/0105753 A1* | 5/2006 | Bocking et al. | 455/417 |
| 2006/0168062 A1* | 7/2006 | Hebert et al. | 709/206 |
| 2007/0036137 A1* | 2/2007 | Horner et al. | 370/352 |
| 2007/0078965 A1* | 4/2007 | Shimamura et al. | 709/224 |
| 2007/0147596 A1* | 6/2007 | Moser | 379/207.02 |

FOREIGN PATENT DOCUMENTS

| | | |
|---|---|---|
| EP | 1 255 414 | 11/2002 |
| EP | 1255414 A2 * | 11/2002 |
| WO | 2004066574 | 8/2004 |

OTHER PUBLICATIONS

European Search Report for EP 06111332.0, mailed Jun. 14, 2006.

* cited by examiner

*Primary Examiner* — David Lazaro
*Assistant Examiner* — Charles Murphy
(74) *Attorney, Agent, or Firm* — Norton Rose Canada LLP

(57) ABSTRACT

A system and method routes messages based on an intended recipient's availability to receive messages. Each network user's current status is determined by tracking when the user activates and deactivates an auto-reply feature. The user's current status, return date and alternate contact(s) are specified in the auto-reply and stored and updated on a user status server which periodically communicates to each user the current status information for each contact listed in that user's address book. When the current status information indicates that the intended recipient is unavailable, message routing options are presented to the sender. These options include sending the message to the user regardless of the intended recipient's current unavailability, not sending the message at all, routing the message to at least one specified alternate contact, sending the message to the intended recipient while sending a copy of the message to the alternate contact.

22 Claims, 5 Drawing Sheets

SYSTEM AND METHOD OF SHARING AUTO-REPLY INFORMATION

TECHNICAL FIELD

The present invention relates generally to telecommunication networks and in particular to a network where each user can activate an auto-reply feature to indicate that the user is unavailable to receive messages.

BACKGROUND OF THE INVENTION

Electronic mail (e-mail) applications such as Microsoft® Outlook™ and Entourage™, Netscape® Messenger™, Eudora™, Pegasus™ and Oracle™ Email enable users to set an auto-reply that automatically replies to incoming messages with a customized text message. This automatic reply feature is known in MS Outlook as "Out of Office Assistant", in Netscape Messenger as "Vacation Message". In Eudora, MS Entourage, Pegasus Mail and Oracle Email, it is simply known as "auto-reply".

Typically, the auto-reply feature enables a user to type and save a brief auto-reply message that will then be automatically sent in reply to all incoming messages or to a subset of those incoming messages based on user-determined rules. The usual custom is for the user to indicate that he or she is away from the office until a certain date, to specify at least one alternate contact, and to provide phone, fax, email and/or other contact information for the alternate contact.

However, there are a number of shortcomings with this current technology. First, if the auto-reply is only sent once and the desired recipient of the original message is away for a long period of time, others may forget they received the auto-reply and wonder why they are still not receiving a reply from the recipient. Second, time is wasted when a message is sent to a person who is unavailable because the sender only learns that the intended recipient is unavailable upon receipt of the auto-reply. Further time is wasted because the sender has to then forward the original message to one or more of the alternate contacts. Third, work may be duplicated unnecessarily if the original recipient later reads the message and is unaware that his alternate contacts are already dealing with the matter that was the subject of the original message. These problems are particularly noticeable in modern work environments where employees are not necessarily working at their desk, but rather are increasingly mobile, using wireless-enabled PDAs and cell phones to communicate while they work from remote locations.

Accordingly, it would be highly desirable to provide a system and method for overcoming some of these deficiencies.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
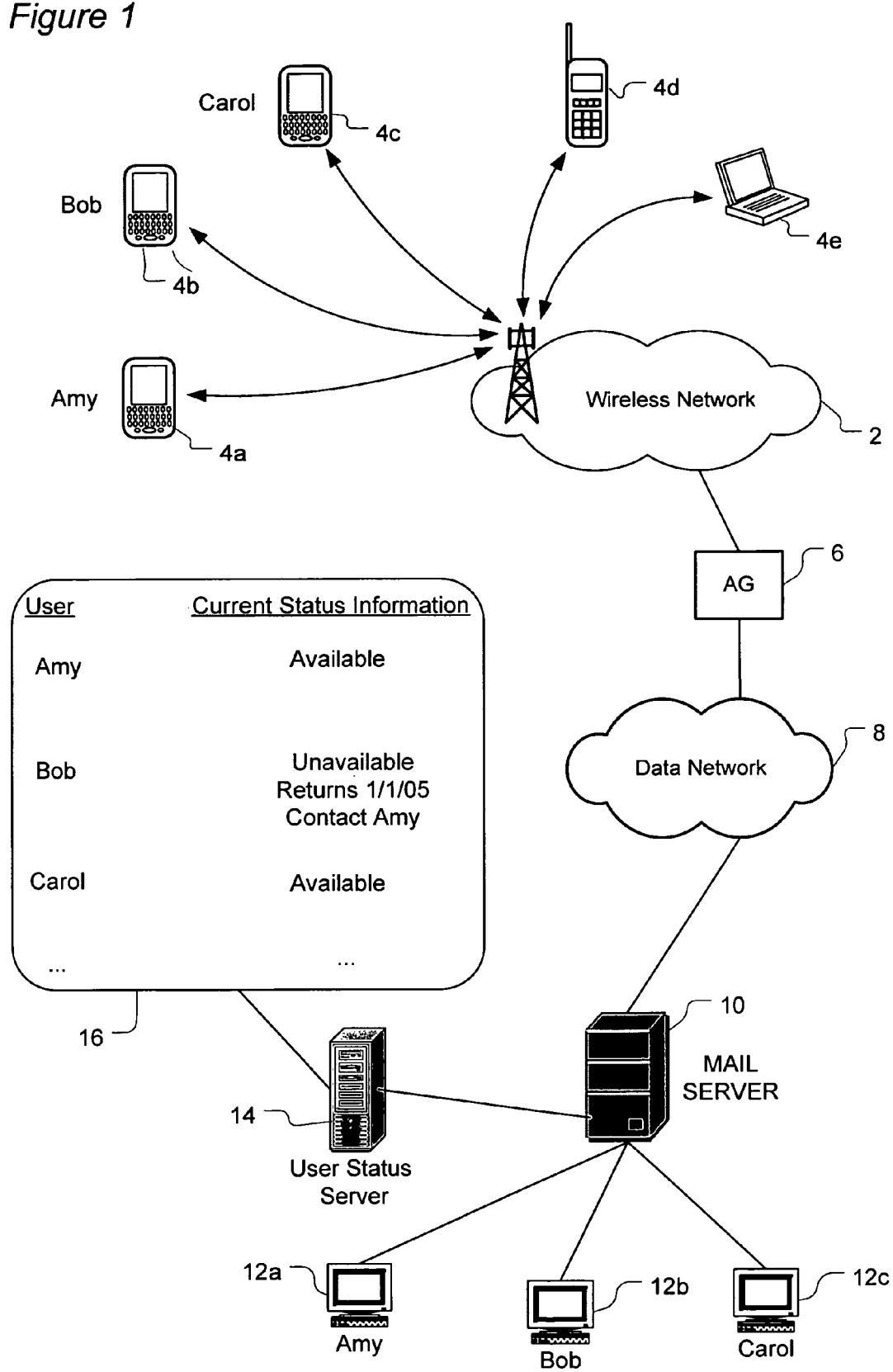
FIG. 1 is a schematic layout of a network incorporating a system for sharing auto-reply information among other network users in accordance with an embodiment of the present invention.

The invention seeks to reduce redundant and wasteful communications by providing a sender, prior to sending a message, with useful information about an intended recipient's availability to receive the message. This is accomplished by tracking-the activation and deactivation of each user's auto-reply feature, or "out of office assistant". The auto-reply feature provides current status information (i.e. whether the user is available or unavailable to receive messages) and optionally also includes a return date and an alternate contact (which can be specified using the auto-reply feature). A user status server collects and periodically updates the current status information for each user. The user status server then shares the current status information with other users in a network by disseminating or sharing this current status information for each user among all other users to make every user aware of every other user's availability to receive messages. Alternatively, the user status server can communicate only the current status information about those contacts appearing in each user's address book, to avoid unduly taxing network resources.

Thus, an aspect of the present invention provides a system for intelligently routing communications to networked users based on user availability. The system includes a plurality of communications devices being adapted to communicate with each other through a mail server connected to the network, each communications device enabling a user of the device to activate and deactivate an auto-reply feature that automatically replies to incoming messages. The system also includes at least one device connected to the network for receiving, storing and updating current status information for each user, the current status information. including an indication as to whether each user is available or unavailable to receive a message. Optionally, the device is a user status server communicatively connected to the mail server to enable the mail server to route a message from a sender to a recipient provided the current status information of the recipient indicates that the recipient is available to receive the message.

In one embodiment, the message routing options include a first option of sending the message to the user regardless of the user's current unavailability, a second option of not sending the message at all, a third option of routing the message to at least one specified alternate contact, and a fourth option of sending the message to the user while sending a copy of the message to the alternate contact.

In another embodiment, the user status server periodically communicates current status information to every user actively connected to the network in order to update each user's address book with current status information for every other user listed in each address book.

In yet another embodiment, the user status server further communicates to all users a return date and an alternate contact for each user whose auto-reply feature is activated, whereby each user's address book can store and display the return date and alternate contact for each user whose current status information indicates that the user is unavailable.

A further aspect of the present invention provides a method of disseminating user availability information through a network to improve communication efficiency. The method includes the steps of determining a current status of each user of the network to determine if each user is currently available to be a recipient of a message; forwarding messages from a sender to the recipient when the recipient's current status indicates to the sender that the recipient is currently available to receive messages; and providing message options to the sender when an intended recipient's current status indicates to the sender that the intended recipient is unavailable to receive the message.

In one embodiment, the determining step includes the steps of, for each user, assuming as a default status that the user is available to receive messages and updating the current status to indicate that the user is unavailable to receive messages in response to activation of the auto-reply feature.

In another embodiment, the determining step further includes the step of updating the current status to indicate that the user is once again available to receive messages in response to deactivation of the auto-reply feature.

In yet another embodiment, the updating steps further include the step of periodically interrogating the mail server to determine which contacts are listed in each user's address book and to communicate to each user only the current status information for the contacts listed in that user's address book.

Yet a further aspect of the present invention provides a mobile wireless terminal device enabled for wireless communication with a data network via a wireless network. The device includes a memory and a microprocessor for executing an e-mail application, the e-mail application being adapted to store and update current status information for at least one other network user, the current status information being indicative of the at least one other user's availability to receive an e-mail.

In one embodiment, the current status information further includes a date of anticipated availability for the at least one other network user when that other network user is indicated to be currently unavailable.

In another embodiment, the current status information further comprises an alternate contact person and respective contact information for the alternate contact person.

The present invention provides a method and system for sharing auto-reply information with other network users to make users aware of other users' unavailability to receive messages before those messages are sent and for providing message routing options when intended recipients are unavailable. Embodiments of the invention are described below, by way of example only, with reference to FIGS. 1-5.

Referring to FIG. 1, a system in accordance with a preferred embodiment of the present invention generally includes a wireless network 2 hosting a plurality of wireless communication devices 4a, 4b, 4c, 4d and 4e (also known as "terminal devices"). As illustrated, the wireless communication devices can be any of a wide variety of wireless devices including but not limited to wireless-enabled PDAs 4a, 4b, 4c, mobile or cellular telephones 4d, wireless-enabled laptop computers 4e, self-service kiosks (not shown) and two-way pagers (not shown).

As shown in FIG. 1, an Application Gateway (A) 6 is coupled between the wireless network 2 and a data network 8, such as for example, the Internet. The AG 2 generally operates to mediate data traffic flowing between wireless communication devices 4a, 4b, 4c, 4d, 4e connected to the wireless network 2 and data services accessible through the data network 8 in the manner described in Applicant's co-pending United States Patent Publications Nos. 2004/0215700 and 2004/0220998, both of which are incorporated herein by reference.

These wireless communication devices, or terminal devices, generally include a microprocessor connected to an RF section for wireless communications, a memory (at least a portion of which will normally be non-volatile), and a user interface (UI) including a display and one or more user input devices (UID), e.g. a keyboard, thumb-wheel, stylus, microphone, etc. The microprocessor operates under software control to provide the functionality of the terminal device. Preferably, the software is designed on a layered model, in which a runtime environment (RE) translates between application software, such as an e-mail application, and the native machine-language of the terminal device to control the terminal device hardware, and communicate with data services. This layered software model, and the manner in which it operates, is known from Applicant's co-pending United States Patent Publications Nos. 2004/0215700 and 2004/0220998.

As described in Applicant's co-pending United States Patent Publications Nos. 2004/0215700 and 2004/0220998, operation of the AG 2 enables a software application (e.g. an e-mail application such as MS Outlook) executing in a terminal device to communicate with data services (not shown) offered through the data network 6. This operation may, for example, include accessing and downloading files from back-end data sources (not shown) connected to the data network 6 or downloading or uploading e-mail messages to and from one or more e-mail exchange servers, or simply "mail servers".

As further shown in FIG. 1, a mail server 10 is connected to the data network for handling e-mail for a plurality of desktop mail clients running on respective personal computers 12a, 12b, 12c, as is well known in the art. As will be readily appreciated, the desktop mail clients could be running on workstations or laptops or any other such computing device.

As further shown in FIG. 1, the system in accordance with a preferred embodiment of the present invention further includes a networked device having both data storage and processing capability, such as for example, a user status server 14 connected to the mail server (or alternatively the user status server 14 can be integrated within the mail server). The user status server 14 receives, stores and updates current status information for users of the network. The current status information includes whether a given user is available or unavailable to receive messages. The system determines a user's availability based on whether or not the auto-reply feature in the user's e-mail application has been activated. For the purposes of this specification, the expressions "auto-reply" or "auto-reply feature" will be used generically to encompass any type of automatic reply functionality whether it is called "Auto-reply" (as it is in Eudora, MS Entourage, Pegasus Mail and Oracle Email) or whether it is called "Out of Office Assistant" as it is in MS Outlook, or "Vacation Message" as it is in Netscape Messenger). Accordingly, the user status server 14 can also be referred to as an "out of office server", although this terminology should not be construed as implying that the user is physically out of the office. In the context of Microsoft e-mail applications, "out of office" means unavailable and does not mean that a user is physically out of the office but roaming with a wireless device and thus available to receive messages. Therefore, though the expression "out of office", has been popularized by Microsoft, it will not be used in this specification in order to avoid possible confusion between unavailability and wirelessly roaming away from one's office.

Where a user has set his auto-reply to indicate that he is unavailable to receive messages, this activation of the auto-reply feature will be signalled or communicated to the user status server 14 for updating the current status information of that user. Likewise, when the auto-reply is deactivated (either manually or automatically, e.g. using a timed expiry), the deactivation of the auto-reply will be communicated to the user status server 14. In other words, the user status server 14 tracks the activation and deactivation of the auto-reply features for each user in order to continually collect and update current status information for that user. The current status information also preferably includes a return date for the return to work of the user and at least one alternate contact to whom messages can be directed for immediate resolution of an urgent matter.

Accordingly, as shown in FIG. 1, the user status server 14 stores and updates current status information for each user in the network (or alternatively a predefined subset thereof). In the example shown in FIG. 1, there are three users, Amy, Bob and Carol, although it should be readily apparent that the user status server 14 can track a much larger number of users. For the sake of illustration, therefore, let it be assumed that Amy, Bob and Carol have their own personal computers 12a, 12b, 12c, respectively, with desktop mail clients connected to the mail server 10 and that each of them also has a wireless PDA for communicating when physically away from their desk. If Bob is planning to be away on holiday, he sets the auto-reply feature in his e-mail application using either his personal computer 12b or his PDA 4b. The mail server 10 synchronizes the desktop mail client with the PDA, in a manner known in the art. The mail server 10 communicates the activation of the auto-reply to the user status server 14 which then updates the current status information for Bob to indicate that he is unavailable. If Bob specified a return date (which in this example he did, namely Jan. 1, 2005) and an alternate contact (which in this example he also did, namely Amy), then this additional information is also passed along to the user status server 14 where it is stored in the current status information for Bob. Therefore, as shown in FIG. 1, the user status server has been updated to indicate that Bob is presently unavailable, that he returns (i.e. becomes available again) on Jan. 1, 2005 and that in his absence urgent inquiries and other pressing matters can be directed to Amy. In this example, the current status information for Amy and Carol does not change, i.e. both Amy and Carol remain at work and hence available. Therefore, it can be seen from this example that the user status server 14 effectively hosts a database that stores and updates each user's status. In the preferred embodiment, the auto-reply feature, when activated, automatically communicates the status information, return date and alternate contacts (and any other information that may be added) to the user status server. Alternatively, this data could be fetched or extracted by the user status server 14 by interrogating the mail server 10.

Figure 2:
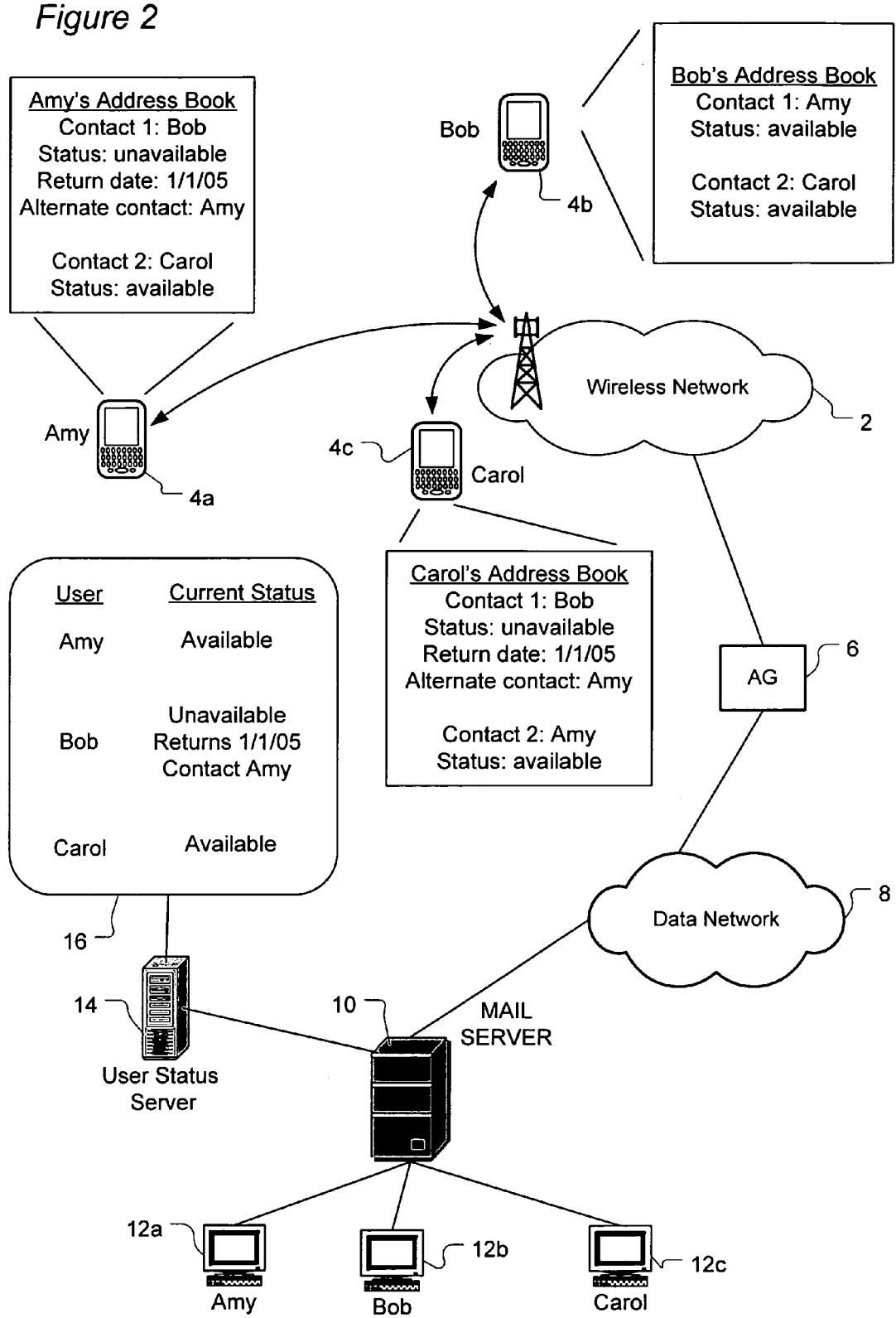
FIG. 2 is a schematic layout of a network incorporating a system for disseminating auto-reply information to other users' address books in accordance with another embodiment of the present invention.

FIG. 2 shows schematically how the user status server 14 can communicate its stored and updated current status information to the various users of the network. For example, and assuming again that Bob is unavailable and that Amy and Carol remain available, the user status server 14 periodically disseminates current status information to Amy's PDA 4a and Carol's PDA 4c (and optionally also to Bob's PDA 4b even if he is away on holiday). This current status information is disseminated to the PDAs via the mail server 10, data network 8, AG 6 and wireless network 2. The mail server 10 can also concurrently disseminate this current status information to the desktop mail clients on Amy's personal computer 12a and Carol's personal computer 12c (and optionally also to Bob's personal computer 12b, even if Bob is unavailable in case Bob wishes to e-mail another user while he himself is unavailable). In another embodiment, the current status information can be disseminated first to PDAs and then the mail server 10 can synchronize the information to the desktop mail clients, or vice versa. In a further embodiment, the auto-reply can prompt the user to specify whether the user wishes to receive current status information on the other users. Whether current status information is disseminated to absent or unavailable users, can also be determined by a system setting at the user status server that enables an organization of users to either disseminate as a general rule current status information to everyone all the time, or to reduce network bandwidth requirements by only disseminating current status information to active or available users.

As shown in FIG. 2, in a preferred embodiment, the current status information is disseminated to other users' address books so that users are made readily aware of other users' availability, return dates and alternate contacts. In one embodiment, current status information on each and every user is disseminated to all users. However, in a preferred embodiment, current status information is disseminated intelligently, based on address book contacts or other such contact lists. In other words, in this preferred embodiment, the user status server 14 periodically interrogates the mail server 10 to extract for each user that user's list of contacts. Accordingly, current status information is only disseminated to a subset of users, representing a particular user's contacts, which thus reduces network bandwidth requirements.

For simplicity of illustration, FIG. 2 only shows the address books on the PDAs, although the mail server 10 would in most instances synchronize the address books on the desktop mail clients, in a manner known in the art. As shown, Amy's address book is updated to indicate that her contact Bob is now unavailable, that his return date is Jan. 1, 2005 and that she herself has been designated as Bob's alternate contact. Carol's address book is updated similarly to Amy's, to also shown that Bob is unavailable, that he returns on Jan. 1, 2005 and that Amy is Bob's alternate contact. Optionally, Bob's address book can also be updated with the same information as Amy's and Carol's address books. Although, depending on whether Bob or his organization wishes to have the system maintain an updated address book for him while he is away, it is not strictly necessary to update Bob's address book.

Figure 3:
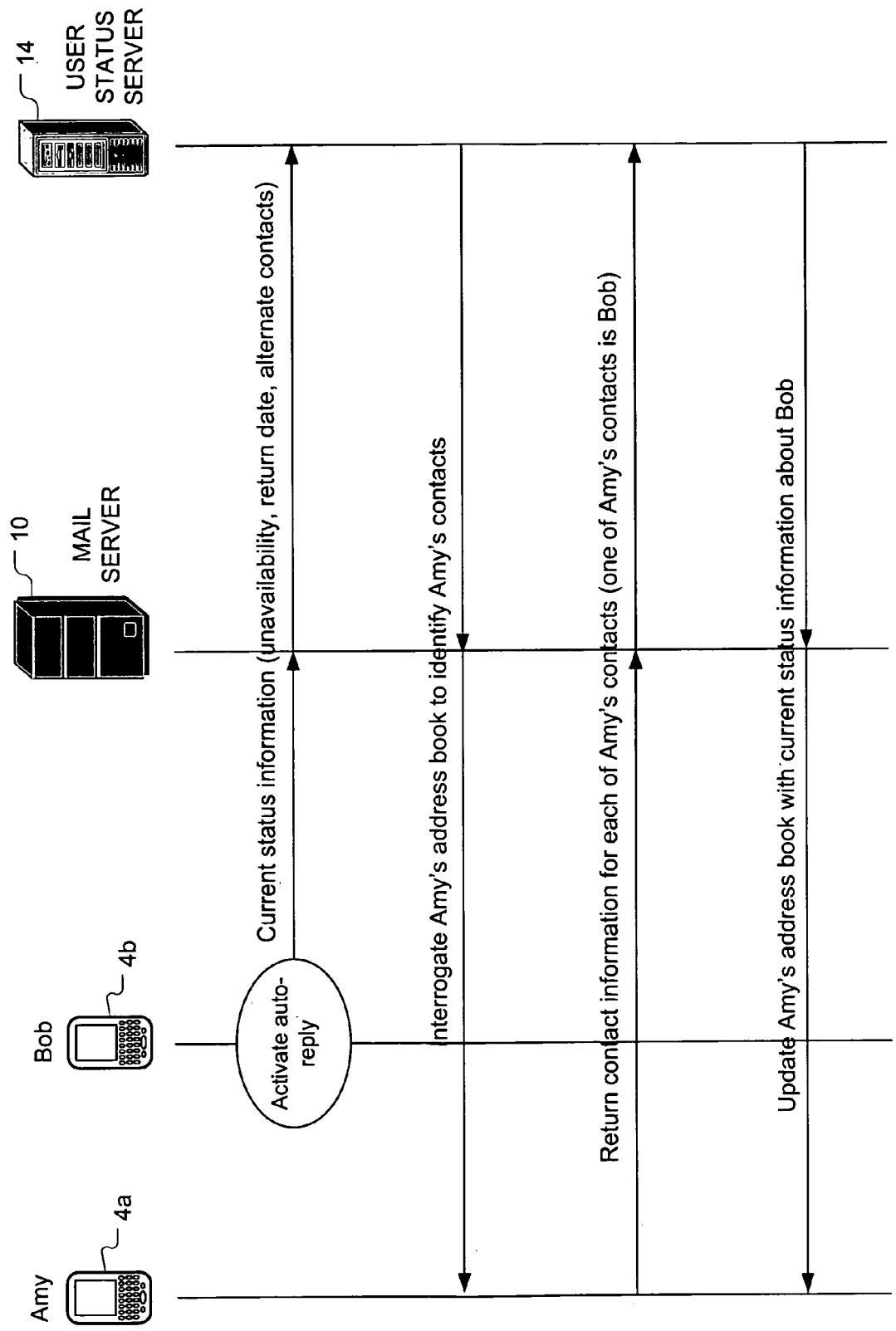
FIG. 3 is a message flow diagram schematically illustrating a method of updating a user's address book in response to another user activating his auto-reply feature, in accordance with an aspect of the present invention.

FIG. 3 is a message flow diagram schematically illustrating a method of updating a user's address book in response to another user activating his auto-reply feature, in accordance with an aspect of the present invention. As shown in the scenario depicted in FIG. 3, it is again assumed that Bob is absenting himself from work and hence making himself unavailable to receive messages. In this particular scenario, before shutting off his PDA, Bob activates the auto-reply feature. The auto-reply feature communicates current status information about Bob, namely his unavailability, return date and alternate contacts, to the user status server 14 via the mail server 10. The user status server 14 then interrogates Amy's address book stored on her PDA via the mail server 10 to identify Amy's contacts. Alternatively, the mail server 10 can cache a copy of Amy's address book in which case the user. status server queries the mail server (assuming the mail server has already obtained the address book from Amy's PDA) Amy's PDA 4a (or the mail server 10) then returns to the user status server 14 a listing of all of Amy's contacts. Since one of the contacts appearing in Amy's address book is Bob, the user status server updates Amy's address book with current status information about Bob. Although this scenario shows a pair of users using wireless PDAs, the method could be performed instead using desktop mail clients on person computers, workstations, laptops, wireless devices or any other combination of communication devices capable of connecting to and exchanging data with the network.

Figure 4:
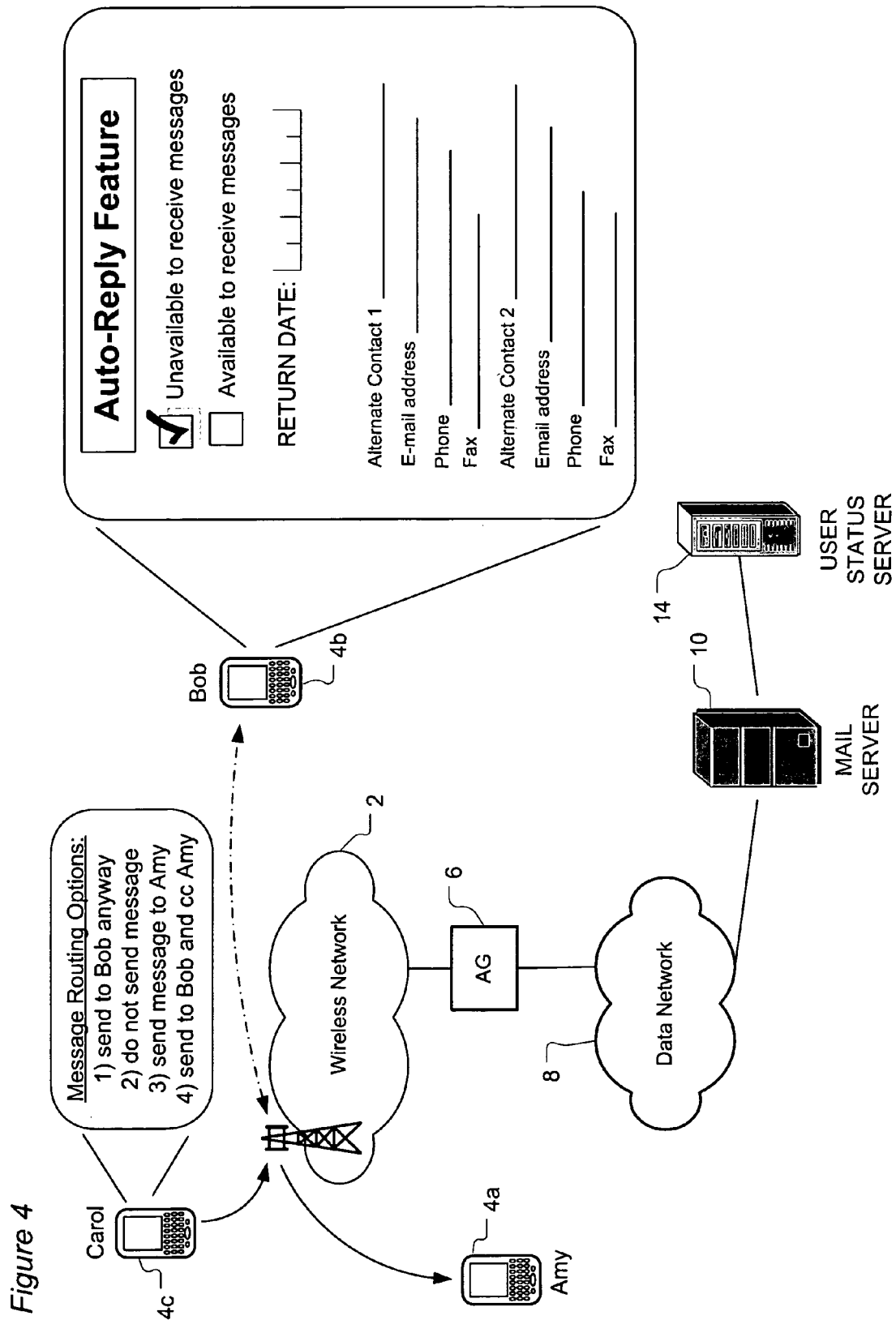
FIG. 4 is a schematic layout of a network incorporating a system for sharing auto-reply information, illustrating an auto-reply feature that enables one user to indicate that he is unavailable and further illustrating the message routing options that are presented to another user when that user attempts to send a message to the user who has indicated that he is unavailable, in accordance with an aspect of the present invention.

FIG. 4 is a schematic layout of a network incorporating a system for sharing auto-reply information, illustrating an auto-reply feature that enables one user to indicate that he is unavailable and further illustrating the message routing options that are presented to another user when that user attempts to send a message to the user who has indicated that he is unavailable, in accordance with an aspect of the present invention. As shown in FIG. 4, the system in accordance with a preferred embodiment of the present invention, includes an auto-reply feature that prompts the user to specify whether he is available to receive messages or unavailable to receive messages. This can be done by providing a clickable toggle to switch between unavailable and available. Preferably, the auto-reply feature also prompts the user to specify a return date in a return date field. Preferably, the auto-reply feature also prompts the user to specify at least one alternate contact and to provide that contact's e-mail address, phone or fax numbers. The system could also perform a check to make sure that the specified alternate contact is not also unavailable. In another embodiment, the system could interface with a calendar application to verify that the specified alternate contact has not blocked off vacation time or other absence coinciding with the user's own absence.

As further shown in FIG. 4, once Bob has activated the auto-reply feature by putting data into required fields, this current status information about Bob is promptly disseminated to the other users-of the network, in this example, to Amy and Carol. In the scenario depicted in FIG. 4, Carol wishes to send an e-mail message to Bob. However; when Carol enters her address book, she will see an icon, symbol or text next to Bob's contact information indicating that he is presently unavailable. Carol will also see, or be able to access, Bob's return date and his alternate contact (in this example, Amy). Alternatively, if Carol simply types in Bob's e-mail address in the "To" line of the new message form, the e-mail application will recognize and underline Bob's e-mail, and then (in the background) query her own address book or send a query to the mail server or user status server to access Bob's current status information.

Where Bob's current status information indicates that he is presently unavailable, the e-mail application will alert Carol prior to her sending the message that Bob is unavailable to receive messages. The e-mail application will also present Carol with message routing options, for example, in a pop-up dialog box. The message routing options preferably include four options, namely a first option of sending the message to the user (e.g. Bob) regardless of the Bob's current unavailability, a second option of not sending the message at all, a third option of routing the message to Amy in her capacity as Bob's alternate contact, and a fourth option of sending the message to the Bob while sending a copy of the message to Amy, the alternate contact. In another embodiment, a subset of these options could be provided. In yet another embodiment, "advanced options" could be also provided, such as for example, voting and tracking options, delivery options, message settings and security parameters.

Figure 5:
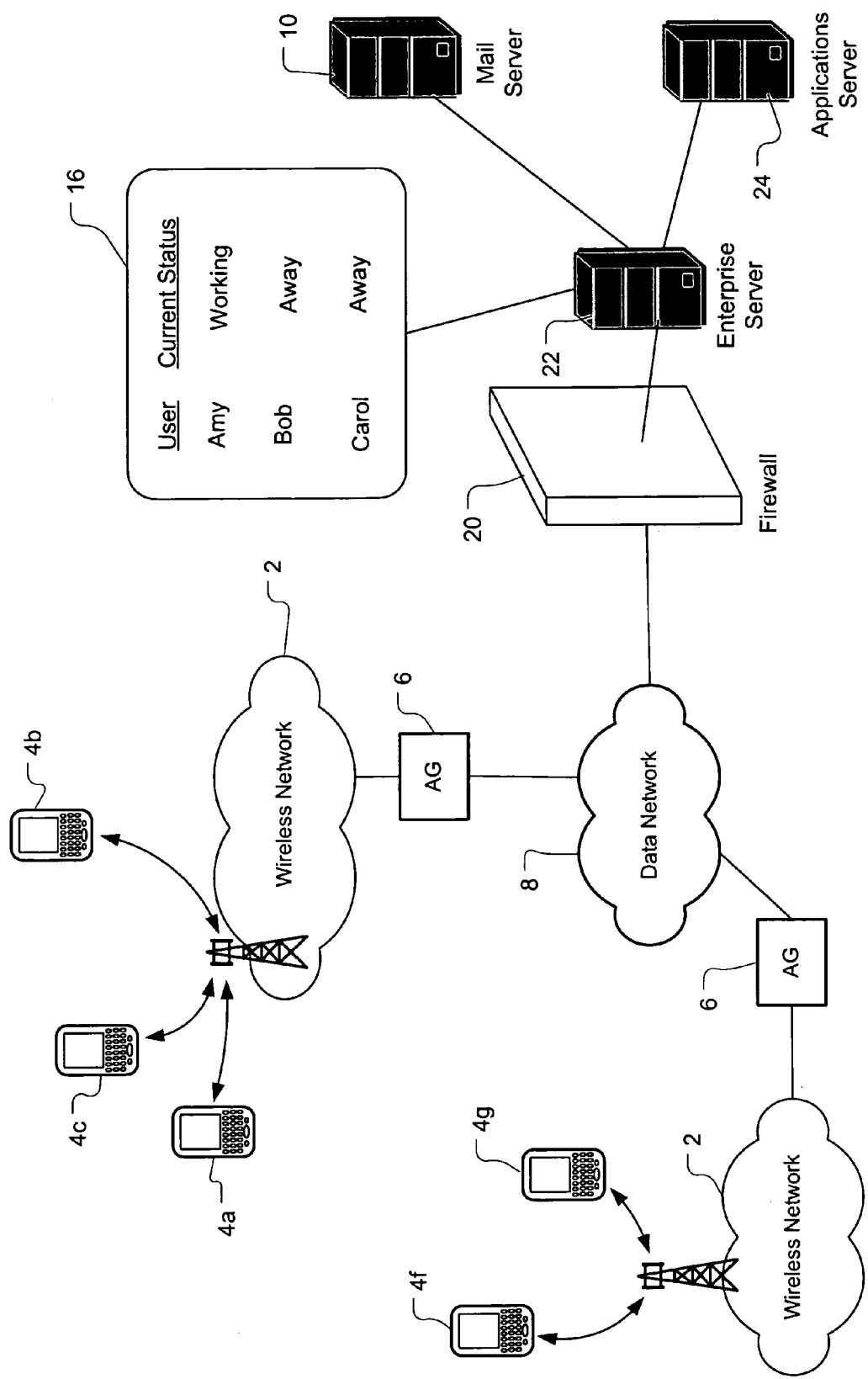
FIG. 5 is a schematic layout of a network in which a Blackberry Enterprise Server (BES) is installed behind a corporate firewall and wherein a mail server tracks each user's current status in accordance with another embodiment of the present invention.

FIG. 5 schematically depicts a network in accordance with another embodiment of the present invention. In this alternative embodiment, an enterprise server 22 is installed behind a corporate firewall 20. The enterprise server 22 is connected to, and coordinates with, both a messaging platform (e.g. the mail server 10) and a corporate applications server 24, as is known in the art. In this embodiment, the enterprise server 22 tracks, stores and updates current status information 16 for each user. In other words, the enterprise server 22 has a memory or other electronic storage that enables storage of current status information for each user. Optionally, the enterprise server 22 can also store a return-to-work date and/or time and an alternate contact (with contact information) for a person to contact in that user's absence. Alternatively, the enterprise server 22 can be connected to an external database or a separate device (such as the user status server described above) that tracks, stores and updates the current status information.

FIG. 5 also illustrates that it is possible to track, store and update current status information for users of different wireless networks 2, i.e. for users whose mobile wireless devices (terminal device) 4a, 4b, 4c, 4f, 4g are wirelessly connected to different wireless networks 2. These wireless networks can be GSM/GPRS, DataTAC, CDMA, iDENO, Mobitex or others. As shown in FIG. 5, the enterprise server 22 connects through the firewall 20 to an external data network 8 (typically the Internet). The data network 8 interfaces with a plurality of different wireless networks 2 via respective application gateways (AGs) 6. Therefore, the mail server 10 can track the current status information for users who are wirelessly connected to more than one type of wireless network. This enables a user of one wireless network to ascertain whether a user of another wireless network is available to receive an email message prior to sending it and to obtain alternate contact information if the intended recipient is unavailable.

As shown in FIG. 5, each of the mobile wireless terminal devices 4a, 4b, 4c, 4f, 4g is enabled for wireless communication with the data network 8 via the respective wireless network 2 (and respective AG 6). The terminal devices (or any other wireless-enabled communications device) includes a memory and a microprocessor for executing an e-mail application for sending and receiving e-mails and attachments, as is now well known in the art. In accordance with an embodiment of the present invention, the e-mail application is adapted to store and update current status information for at least one other network user. The current status information is indicative of the at least one other user's availability to receive an e-mail. Optionally, the current status information further includes a date of anticipated availability for the at least one other network user when that other network user is indicated to be currently unavailable. Optionally, the current status information further includes an alternate contact person and respective contact information for the alternate contact person.

For the purpose of this specification, "communications device" includes wireless communications device, such as a wireless-enabled PDA, cellular or mobile phone, wireless-enabled laptop, and also includes wired or "wireline" devices such as telephone, fax, and personal computers (or laptops or workstations) connected via modem to a data network such as the Internet. While the embodiments described herein are directed primarily to electronic mail being exchanged among a group of users having networked computers and wireless-enabled PDAs, the embodiments could be modified for use with other telecommunication devices. For example, a fax machine could have an auto-reply feature that automatically sends a return fax to the incoming number when the user is away from the office. The fax machine could be modified, in accordance with the teachings of the present specification, to signal the activation of the auto-reply feature to the user status server which could then communicate this information to other users to inform them of this particular user's unavailability. Similarly, the fax machine could be modified to enable the user to enter a return date and one or more alternate contacts. This additional information would then be communicated to the user status server for dissemination ("sharing") with other users.

The embodiments of the invention described above are intended to be exemplary only. The scope of the invention is therefore intended to be limited solely by the scope of the appended claims.

A portion of the disclosure of this patent document may contain material that is subject to copyright protection. The copyright owner has no objection to the facsimile reproduction by anyone of the patent document or patent disclosure, as it appears in the Patent and Trademark Office patent file or records, but otherwise reserves all copyright.

We claim:

1. A method at a server, the method comprising:
  receiving current contact status information communicated by a first communication device, the contact status information indicating availability of a first user associated with the first communication device;
  storing the current contact status information for the first user;
  wherein, for current contact status information indicating unavailability of the first user, the current contact status information includes one or more alternate contacts associated with the first user;
  verifying availability of the one or more alternate contacts;
  prior to updating an address book of a second communication device, verifying availability of a second user independently of a connection status of the second user, by checking stored current contact status information for the second user, the second user being associated with the second communication device,
  when the second user is available, interrogating the address book of the second communication device to identify an entry of the first user in the address book of the second communication device;
  updating the address book of the second communication device with the current contact status information about the first user including the one or more alternate contacts; and
  where the current contact status information for the first indicates unavailability:
    transmitting from the server to the second communication device message routing options for communicating with the first user;
    the message routing options being based on the current contact status information for the first user;
    wherein the message routing options for communicating with the first user include an option to route a message to the one or more alternate contacts.

2. The method of claim 1, wherein interrogating the address book and updating the address book of the second communication device comprises:
  receiving a listing of entries in the address book of the second communication device; and
  performing the updating when an entry in the listing is the first user.

3. The method of claim 1, further comprising tracking the activation and deactivation of an auto-reply feature communicated to the server for updating the current contact status information.

4. The method of claim 1 wherein the first communication device is a wireless communication device.

5. The method of claim 1 further comprising periodically communicating the current contact status information to the second communication device to update the address book of the second communication device with the current contact status information.

6. The method of claim 1 further comprising performing the updating in response to activating an auto-reply feature.

7. A server in a network system, the server comprising a processor and a memory coupled to the processor, the memory having computer-readable instructions encoded thereon, the instructions being executable by the processor to cause the server to:
  receive current contact status information communicated by a first communication device, the current contact status information indicating availability of a first user associated with the first communication device;
  store the current contact status information for the first user;
  wherein, for current contact status information indicating unavailability of the first user, the current contact status information includes one or more alternate contacts associated with the first user;
  verify availability of the one or more alternate contacts;
  prior to updating an address book of a second communication device, verify availability of a second user independently of a connection status of the second user, by checking stored current contact status information for the second user, the second user being associated with the second communication device;
  when the second user is available, interrogate the address book of a second communication device to identify an entry of the first user in the address book of the second communication device;
  update the address book with the current contact status information about the first user of the first communication device, including the one or more alternate contacts; and
  where the current contact status information for the first user indicates unavailability:
    transmit from the server to the second communication device message routing options for communicating with the first user;
    the message routing options being based on the current contact status information for the first user;
    wherein the message routing options for communicating with the first user include an option to route a message to the one or more alternate contacts.

8. The server of claim 5, wherein the instructions are executable by the processor to further cause the server, in order to interrogate the address book and update the address book of the second communication device, to:
  receive in return a listing of entries in the address book of the second communication device; and
  perform the updating when an entry in the listing is the first user.

9. The server of claim 7, wherein the instructions are executable by the processor to further cause the server to track the activation and deactivation of an auto-reply feature communicated to the server for updating the current contact status information.

10. The server of claim 7 wherein the first communication device is a wireless communication device.

11. The server of claim 7, wherein the instructions are executable by the processor to further cause the server to periodically communicate the current contact status information to the second communication device to update the address book of the second communication device with the current contact status information.

12. The server of claim 7, wherein the instructions are executable by the processor to further cause the server to perform the updating in response to activating an auto-reply feature.

13. The method of claim 3, wherein information about the one or more alternate contacts is included in the activation of the auto-reply feature.

14. The method of claim 1, wherein the message routing options further comprise at least one of: an option of sending the message to the first user regardless of the first user's current unavailability; an option of not sending any message; and an option of sending the message to the first user while sending a copy of the message to the one or more alternate contacts.

15. The method of claim 1, wherein transmitting the message routing options for communicating with the first user comprises:
receiving at the server, from the second communication device, a request to send a message to the first user; and
transmitting, from the server to the second communication device, the message routing options for communicating with the first user, in response to the received request.

16. The server of claim 9, wherein information about the one or more alternate contacts is included in the activation of the auto-reply feature.

17. The server of claim 7, wherein the message routing options further comprise at least one of: an option of sending the message to the first user regardless of the first user's current unavailability; an option of not sending any message; and an option of sending the message to the first user while sending a copy of the message to the at least one alternate contact.

18. The server of claim 7, wherein the instructions are executable by the processor to further cause the server, in order to transmit the message routing options for communicating with the first user to:
receive at the server, from the second communication device, a request to send a message to the first user; and
transmit, from the server to the second communication device, the message routing options for communicating with the first user, in response to the received request.

19. The method of claim 1, wherein the current contact status information for the first user includes a return date.

20. The method of claim 1, wherein verifying availability of the one or more alternate contacts comprises checking a calendar application of the one or more alternate contacts.

21. The server of claim 7, wherein the current contact status information for the first user includes a return date.

22. The server of claim 7, wherein the instructions are executable by the processor to further cause the server, in order to verify availability of the one or more alternate contacts, to check a calendar application of the one or more alternate contacts.

\* \* \* \* \*

UNITED STATES PATENT AND TRADEMARK OFFICE
CERTIFICATE OF CORRECTION

| | |
|---|---|
| PATENT NO. | : 8,296,370 B2 |
| APPLICATION NO. | : 11/352315 |
| DATED | : October 23, 2012 |
| INVENTOR(S) | : Neil Adams and Raymond Vander Veen |

It is certified that error appears in the above-identified patent and that said Letters Patent is hereby corrected as shown below:

In column 10, line 55, the first line of claim 8 "8. The server of claim 5..." should be replaced with "8. The server of claim 7..."

Signed and Sealed this
Twenty-sixth Day of February, 2013

Teresa Stanek Rea
*Acting Director of the United States Patent and Trademark Office*